(12) United States Patent
Park

(10) Patent No.: US 8,786,749 B2
(45) Date of Patent: Jul. 22, 2014

(54) DIGITAL PHOTOGRAPHING APPARATUS FOR DISPLAYING AN ICON CORRESPONDING TO A SUBJECT FEATURE AND METHOD OF CONTROLLING THE SAME

(75) Inventor: Wan-je Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 392 days.

(21) Appl. No.: 13/204,795

(22) Filed: Aug. 8, 2011

(65) Prior Publication Data

US 2012/0105676 A1 May 3, 2012

(30) Foreign Application Priority Data

Oct. 27, 2010 (KR) ........................ 10-2010-0105390

(51) Int. Cl.
*H04N 5/222* (2006.01)
*H04N 5/228* (2006.01)

(52) U.S. Cl.
USPC ................................. 348/333.02; 348/222.1

(58) Field of Classification Search
CPC . H04N 5/23293; H04N 5/232; H04N 5/2251; H04N 5/772; H04N 5/335; H04N 5/23248
USPC ................ 348/207.99, 77, 78, 222.1, 333.01, 348/333.11; 382/118
See application file for complete search history.

(56) References Cited

U.S. PATENT DOCUMENTS

| | | | |
|---|---|---|---|
| 8,149,313 B2* | 4/2012 | Watanabe et al. | 348/333.02 |
| 8,285,108 B2* | 10/2012 | Fukuda | 386/228 |
| 8,456,104 B2* | 6/2013 | Allard et al. | 315/294 |
| 2002/0015514 A1* | 2/2002 | Kinjo | 382/118 |
| 2004/0080670 A1* | 4/2004 | Cheatle | 348/441 |
| 2005/0008246 A1* | 1/2005 | Kinjo | 382/254 |
| 2008/0037841 A1* | 2/2008 | Ogawa | 382/118 |
| 2008/0317455 A1* | 12/2008 | Abe | 396/263 |
| 2010/0177207 A1* | 7/2010 | Fukuda | 348/222.1 |
| 2011/0216217 A1* | 9/2011 | Ogawa | 348/222.1 |
| 2011/0216218 A1* | 9/2011 | Ogawa | 348/222.1 |

* cited by examiner

*Primary Examiner* — Nicholas Giles
(74) *Attorney, Agent, or Firm* — Drinker Biddle & Reath LLP

(57) ABSTRACT

A digital photographing apparatus and a method of controlling the same. The digital photographing apparatus detects a feature of a subject from an input image, and displays an icon corresponding to the detected feature.

19 Claims, 8 Drawing Sheets

DIGITAL PHOTOGRAPHING APPARATUS FOR DISPLAYING AN ICON CORRESPONDING TO A SUBJECT FEATURE AND METHOD OF CONTROLLING THE SAME

CROSS-REFERENCE TO RELATED PATENT APPLICATION

This application claims the benefit of Korean Patent Application No. 10-2010-0105390, filed on Oct. 27, 2010, in the Korean Intellectual Property Office, the entire disclosure of which is incorporated herein by reference.

BACKGROUND

1. Field of the Invention

One or more aspects of the invention relate to digital photographing apparatuses and methods of controlling the same where a feature of a subject is extracted and an icon is selected represented the feature of the subject.

2. Description of the Related Art

Digital photographing apparatus obtain images in a photographing operation and store the obtained image in a storage medium. The still image may be displayed on a display of the digital photographing apparatus.

The images that a user sees on the display of the digital photographing apparatus may be very small so that it is difficult for the user to tell whether or not the subject or subjects are appropriately posed for an picture.

SUMMARY

Therefore there is a need in the art for a method and digital photographing apparatus, the digital photographing apparatus including a digital signal processing unit for detecting a feature of a subject from an input image and for displaying an icon corresponding to the feature.

The feature of the subject may include at least one of an outer appearance of the subject, an eye size of the subject, a lip shape of the subject, and a movement of the subject.

The input image may be a live view image.

The feature of the subject may include a dress color of the subject, and the digital signal processing unit may display the icon having the same color as the dress color.

The digital signal processing unit may change and display the icon according to a change in the feature of the subject.

The feature of the subject may be an outer appearance of the subject, and the digital photographing apparatus may be configured to display the icon to indicate whether or not it is appropriate to capture an image of the subject based on the feature of the subject.

The digital signal processing unit may control an output of a voice corresponding to the icon, according to a user's selection.

The digital signal processing unit may include a subject feature detecting unit for detecting the feature of the subject of the input image; an icon storage unit for storing the icon corresponding to the feature of the subject; and a display controlling unit for extracting the icon corresponding to the feature of the subject from the icon storage unit, and for displaying the extracted icon together with the subject.

The digital signal processing unit may synthesize a captured image using the input image and the displayed icon.

The subject feature detecting unit may include a face detecting unit for detecting a face region of the subject; a face determining unit for determining at least one of an eye size and a lip shape of the detected face region; an appearance determining unit for determining at least one of a dress color of the subject, and whether the subject is wearing glasses; and a movement determining unit for determining whether a movement of the subject is at least one of an active movement and a passive movement.

According to another aspect of the invention, there is provided a digital photographing apparatus including a subject feature detecting unit for detecting a feature of a subject from a live view image; an icon storage unit for storing an icon corresponding to the feature of the subject; and a display controlling unit for extracting the icon corresponding to the feature of the subject from the icon storage unit, and for displaying the extracted icon together with the subject.

The feature of the subject may include at least one of an outer appearance of the subject, an eye size of the subject, a lip shape of the subject, and a movement of the subject.

The feature of the subject may include a dress color of the subject, and the display controlling unit may display the icon having the same color as the dress color.

The digital photographing apparatus may further include a voice output controlling unit for controlling an output of a voice corresponding to the icon, according to a user's selection.

According to another aspect of the invention, there is provided a method of controlling a digital photographing apparatus, the method including detecting a feature of a subject from an input image; and displaying an icon corresponding to the feature.

The feature of the subject may include at least one of an outer appearance of the subject, an eye size of the subject, a lip shape of the subject, and a movement of the subject.

The feature of the subject may include a dress color of the subject, and wherein the displaying may include displaying an icon having the same color as the dress color.

The method may further include controlling an output of a voice corresponding to the icon, according to a user's selection.

The displaying may include changing and displaying the icon according to a change in the feature of the subject.

The detecting may include detecting a face region of the subject; determining at least one of an eye size and a lip shape of the detected face region; determining at least one of a dress color of the subject, and whether the subject is wearing glasses; and determining whether a movement of the subject is at least one of an active movement and a passive movement.

The displaying may include selecting at least one icon to be displayed according to a predetermined priority, when the feature of the subject corresponds to a plurality of icons; and displaying the selected icon together with the subject.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
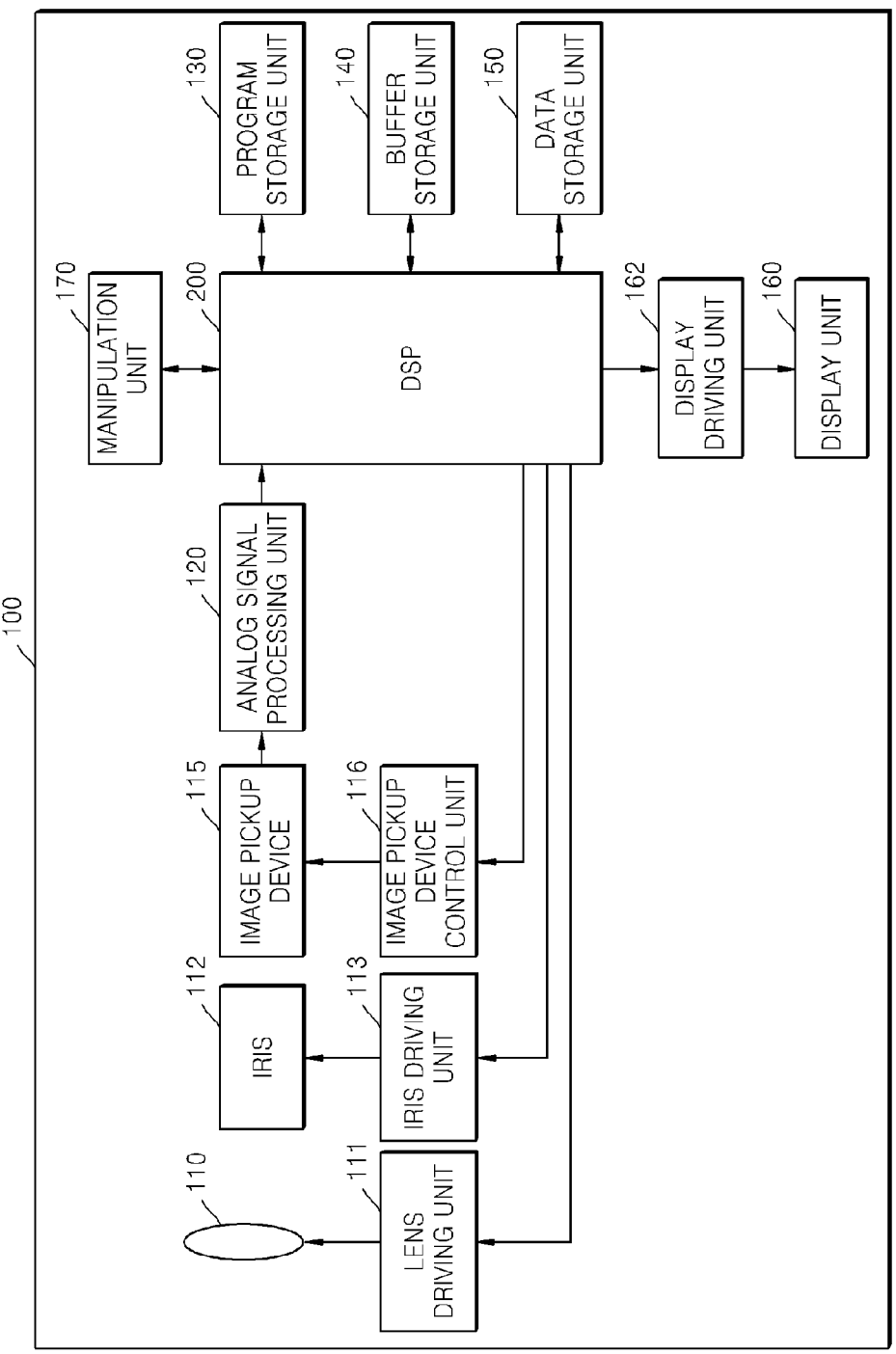
FIG. 1 is a block diagram of a digital photographing apparatus as a digital camera, according to an embodiment of the invention.

Hereinafter, the invention will be described in detail by explaining exemplary embodiments of the invention with reference to the attached drawings. Like reference numerals in the drawings denote like elements.

FIG. 1 is a block diagram of a digital photographing apparatus as a digital camera 100, according to an embodiment of the invention.

Although the digital camera 100 will be described, the invention is not limited thereto. For example, a camera phone having a camera function, a personal digital assistant (PDA), or a portable multimedia player (PMP) may also be used.

The digital camera 100 may include a lens unit 110, a lens driving unit 111, an iris 112, an iris driving unit 113, an image pickup device 115, an image pickup device control unit 116, an analog signal processing unit 120, a program storage unit 130, a buffer storage unit 140, a data storage unit 150, a display driving unit 162, a display unit 160, a digital signal processing unit (DSP) 200, and a manipulation unit 170. In this case, the lens unit 110, the lens driving unit 111, the iris 112, the iris driving unit 113, the image pickup device 115, the image pickup device control unit 116, and the analog signal processing unit 120 may be collectively referred to as an image pickup unit.

The lens unit 110 obtains an optical signal. The lens unit 110 may include a zoom lens for widening or narrowing a viewing angle according to a focal length of the lens unit 110 and a focus lens for focusing on a subject. Each of the zoom lens and the focus lens may be formed as a single lens or a group of a plurality of lenses.

The iris 112 adjusts an amount of light incident on the image pickup device according to an opening degree of the iris 112.

The lens driving unit 111 and the iris driving unit 113 receive control signals from the DSP 200, and respectively drive the lens unit 110 and the iris 112. The lens driving unit 111 adjusts the focal length of the lens unit 110 by adjusting a position of the lens unit 110, and performs auto focusing, zoom changing, focus changing, and the like. The iris driving unit 113 adjusts the opening degree of the iris 112, and performs auto focusing, automatic exposure adjustment, focus changing, field depth adjustment, and the like by adjusting an F number.

The optical signal passing through the lens unit 110 reaches a light-receiving surface of the image pickup device 115 and forms an image of the subject. The image pickup device 115 may be a complementary metal oxide semiconductor image sensor (CIS) or a charge coupled device (CCD) to convert the optical signal into an electric signal. Sensitivity of the image pickup device 115 may be controlled by the image pickup device control unit 116. The image pickup device control unit 116 may control the image pickup device 115 according to a control signal that is manually input by a user's manipulation, or a control signal that is automatically generated in response to an image signal that is input in real time.

An exposure time of the image pickup device 115 is adjusted by using a shutter (not shown). The shutter may be a mechanical shutter for adjusting the amount of light incident on the image pickup device 115 by moving a lens shade up and down, or an electronic shutter for adjusting the amount of incident light by applying an electric signal to the image pickup device 115.

The analog signal processing unit 120 performs noise reduction, gain control, waveform shaping, analog-digital conversion, and the like on an analog signal applied from the image pickup device 115.

An external source such as the user may input control signals to the manipulation unit 170. The manipulation unit 170 may include a shutter-release button for inputting a shutter-release signal for exposing the image pickup device 115 to light for a predetermined period of time so as to capture an image, a power button for inputting a control signal for on/off control of a power source, a wide angle-zooming button and telephoto angle-zooming button for widening or narrowing a viewing angle according to an input, and other various functional buttons for inputting messages, selecting a photographing mode or a reproduction mode, selecting a white balance setting function, and selecting a exposure setting function. The manipulation unit 170 may include the above-described various buttons, but the invention is not limited thereto. That is, the manipulation unit 170 may include any device for inputting a user's input, such as a keyboard, a touch pad, a touch screen, and a remote controller.

The digital camera 100 includes the program storage unit 130 for storing programs of, for example, operating and application systems, the buffer storage unit 140 for temporarily storing data necessary for and result data of various operations, and the data storage unit 150 for storing various types of data necessary for the programs, for example, image files including image signals.

The digital camera 100 includes the display unit 160 for displaying an operation state of the digital camera 100 or image data captured by the digital camera 100. The display unit 160 may provide visual information and audible information to the user. In order to provide visual information to the user, the display unit 160 may include a liquid crystal display (LCD) panel or an organic light-emitting display (OLED) panel. The display driving unit 162 provides driving signals to the display unit 160.

The digital camera 100 includes the DSP 200 for processing an input image signal and controlling each element of the digital camera 100. The DSP 200 may reduce noise in input image data, and perform image signal processing for image quality improvement, such as gamma correction, color filter array interpolation, color matrix, color correction, or color enhancement. The DSP 200 may generate an image file by compressing image data that is generated by the image signal processing for image quality improvement, and may restore the image data from the image file. The image data may be reversibly or irreversibly compressed in a joint photographic experts group (JPEG) format or a JPEG2000 format. The image file may be stored in the data storage unit 150. The DSP 200 may perform sharpening, color processing, blur processing, edge emphasis, image analysis, image recognition, image effect processing, and the like. The image recognition may include face recognition and scene recognition. For example, the DSP 200 may perform image synthesis such as brightness adjustment, color correction, contrast adjustment, outline emphasis, screen split, or character image generation.

Also, the DSP 200 may execute the programs stored in the program storage unit 130, generate a control signal for controlling auto focusing, zoom change, focus change, automatic exposure correction, and the like by using a separate module, provide the control signal to the lens driving unit 111, the iris driving unit 113, and the image pickup device control unit 116, and control operations of the elements included in the digital camera 100 such as the shutter and a flash.

Figure 2:
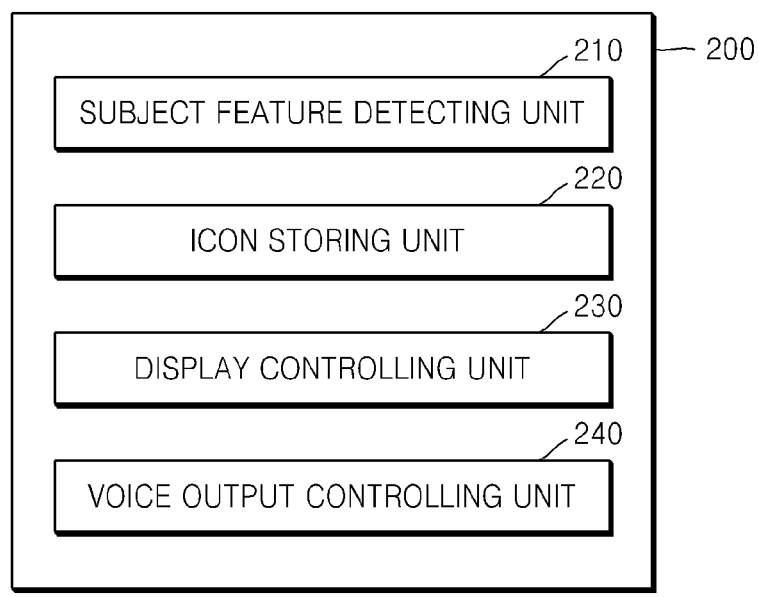
FIG. 2 is a detailed block diagram of a digital signal processing unit (DSP) of FIG. 1, according to an embodiment of the invention.

FIG. 2 is a detailed block diagram of the DSP 200 of FIG. 1, according to an embodiment of the invention.

Referring to FIG. 2, the DSP 200 detects a feature of a subject from an input image, and displays an icon corresponding to the feature of the subject on the display unit 160. In this case, the input image includes a live view image, and the feature of the subject includes an outer appearance, an eye size, a lip shape, or a movement of the subject. For example, if the subject is human, the feature of the subject includes a dress color of the subject, whether the subject is wearing glasses, whether the eyes of the subject are closed, whether the eyes of the subject are narrowed, whether the eyes of the subject are appropriately opened, whether the eyes of the subject are excessively opened, whether the lips of the subject form a smile, whether the lips of the subject do not form a smile, whether the lips of the subject form a forced smile, whether a movement of the subject is active or passive, or the like. The DSP 200 detects the feature of the subject, and displays an icon corresponding to the feature. For example, the icon may have the same color as the dress color of the subject. When the subject has a plurality of features, for example, when the subject is wearing glasses and the eyes of the subject are closed, the features may each be displayed, or any one of the features may be displayed according to a predetermined priority.

In addition, the DSP 200 may detect the feature of the subject in real time in the live view image and may change and display the icon in real time according to a change in the feature of the subject. For example, when the subject does not smile, the DSP 200 displays an icon of a negative or frowning face. Then, when the subject smiles according to a photographer's notification, the DSP 200 displays an icon of a smiling face. In this case, when an icon that is not appropriate for photographing, such as an icon of a face with closed eyes or a frowning face, is displayed, a stored voice such as "Please, smile.", "Cloud on your face. Please, smile.", or the like corresponding to the displayed icon is output by the photographer's manipulation, for example, by touching a corresponding icon, or automatically, thereby guiding the subject through the photographing.

In addition, the photographing is performed to capture an image when the icon is displayed in the live view image, and then the DSP 200 may synthesize the captured image and the icon according to a user's selection, and may store and record the synthesized image.

Referring back to FIG. 2, the DSP 200 includes a subject feature detecting unit 210, an icon selecting and storing unit 220, a display controlling unit 230, and a voice output controlling unit 240. In this specification, the DSP 200 including the above-described components will be described. However, the components may not be individually embodied, and functions thereof may simply be performed by the DSP 200.

Figure 3:
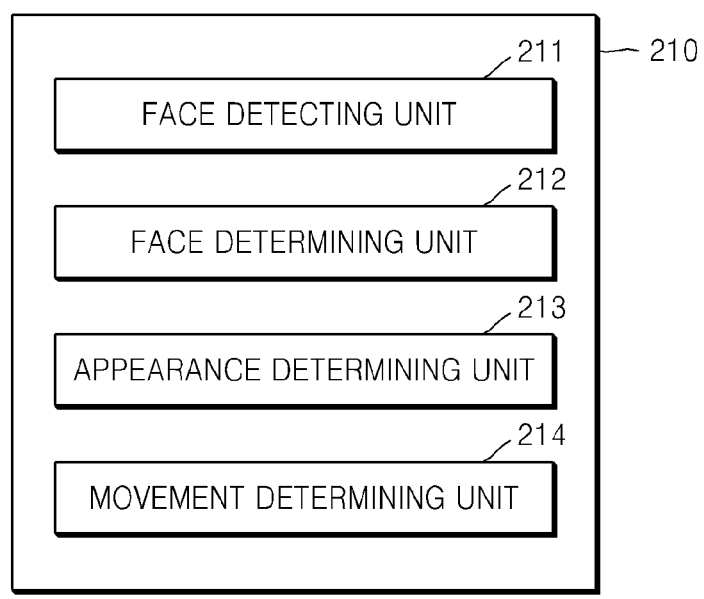
FIG. 3 is a detailed block diagram of a subject feature detecting unit of FIG. 2, according to an embodiment of the invention.

The subject feature detecting unit 210 detects the feature of the subject from the input image. In this case, the feature of the subject includes the outer appearance, the eye size, the lip shape, or the movement of the subject, but is not limited thereto. Referring to FIG. 3, the subject feature detecting unit 210 includes a face detecting unit 211, a face determining unit 212, an appearance determining unit 213, and a movement determining unit 214.

The face detecting unit 211 detects a face region of the subject. The face detecting unit 211 may detect whether the face region is positioned within the live view image by using data for detecting a face, wherein the data is stored in the data storage unit 150 of FIG. 1, where the face region is positioned if the face region is positioned within the live view image, and the like. A face may be detected using various methods. For example, since data about a main color of a face is previously stored, the face may be detected by determining whether image data contains the data about the main color of the face. Since data about a shape of a pupil or eye is previously stored, the face may be detected by determining whether the image data contains the data about the shape of the pupil or eye. In addition, since data about a shape of a T zone including eyebrows (or eyes) and a nose is previously stored, the face may be detected by determining whether the image data contains the data about the shape of the T zone.

The face determining unit 212 determines an eye size of eyes and a lip shape of lips of the detected face region. The eye size and the lip shape may be determined using various methods. For example, the eye size, for example, a size corresponding to a closed eye, a razor thin eye, a normal eye, a big eye, or the like, may be determined according to whether the eyes are closed, or how wide the eyes are opened, and may be determined by comparing a ratio of a vertical length to a horizontal length with a predetermined ratio and then determining whether the ratio of the vertical length to the horizontal length is greater than the predetermined ratio. The lip shape may be determined by comparing data about a lip detected from the current input image with data about standard lip shapes such as shapes corresponding to lips forming a smile, lips not forming a smile, lips forming a forced smile, and the like.

The appearance determining unit 213 determines the dress color of the subject, and whether the subject is wearing glasses.

The movement determining unit 214 determines whether the movement of the subject is active or passive. Whether the subject is moving quickly or slowly is determined by detecting movement vectors of the subject in two consecutive frames of the input image.

The icon storing unit 220 selects and stores the icon corresponding to the feature of the subject. In this case, the icon may be stored in the data storage unit 150 of FIG. 1, or another storage unit. The icon may be variously configured according to the features of the subject. For example, when the subject is wearing glasses, an icon depicting glasses is selected and stored. When the eyes of the subject are closed, an icon depicting a care mark about closed eyes is stored. When the eyes of the subject are narrowed, an icon depicting razor thin eyes is stored. When the eyes of the subject are appropriately opened, an icon depicting 'OK' is selected and stored. When the eyes of the subject are widely opened, an icon depicting a surprised face is stored. When the lips of the subject form a smile, an icon depicting a smiling face is selected and stored. When the lips of the subject do not form a smile, an icon depicting a negative face is selected and stored. When the lips of the subject form a forced smile, an icon depicting an angry face, a cloud, or lightning is selected and stored. When the movement of the subject is active, an icon depicting notes is selected and stored. When the movement of the subject is passive, an icon depicting 'Relax' is selected and stored. In addition, an inappropriate icon for photographing, such as the icon depicting a care mark about closed eyes or the icon depicting a negative face, is selected and stored and a voice requesting a face change, such as "Please, smile.", "Please, don't frown.", or the like may be associated with the selected icon. The icon may not be actually stored but associated with a position in the image. The icon storing unit 220 may modify the size, color, and/or shape of a stored icon in accordance with a subject and the feature of the subject extracted by the subject feature detecting unit 210.

The display controlling unit 230 retrieves the icon selected by the icon storing unit 220 for the feature of the subject, and controls a displaying operation so as to display the retrieved icon together with the subject on the display unit 160. The icon may be integrated with the image in the data storage unit 150 or the buffer storage unit 140. Alternatively, the icon may be positioned on the display unit 160 relative to the location of the subject that the subject feature detecting unit 210 extracted the feature from the subject.

The voice output controlling unit 240 controls an output of a voice associated with the displayed icon which may be according to a user's selection. The user's selection may be set by touching a corresponding icon or by using menu settings. The voice output controlling unit 240 extracts the voice associated with the icon from the icon storing unit 220, and outputs the voice.

FIGS. 4 through 7 show examples for explaining icons corresponding to detected features of a subject, according to embodiments of the invention.

Figure 4:
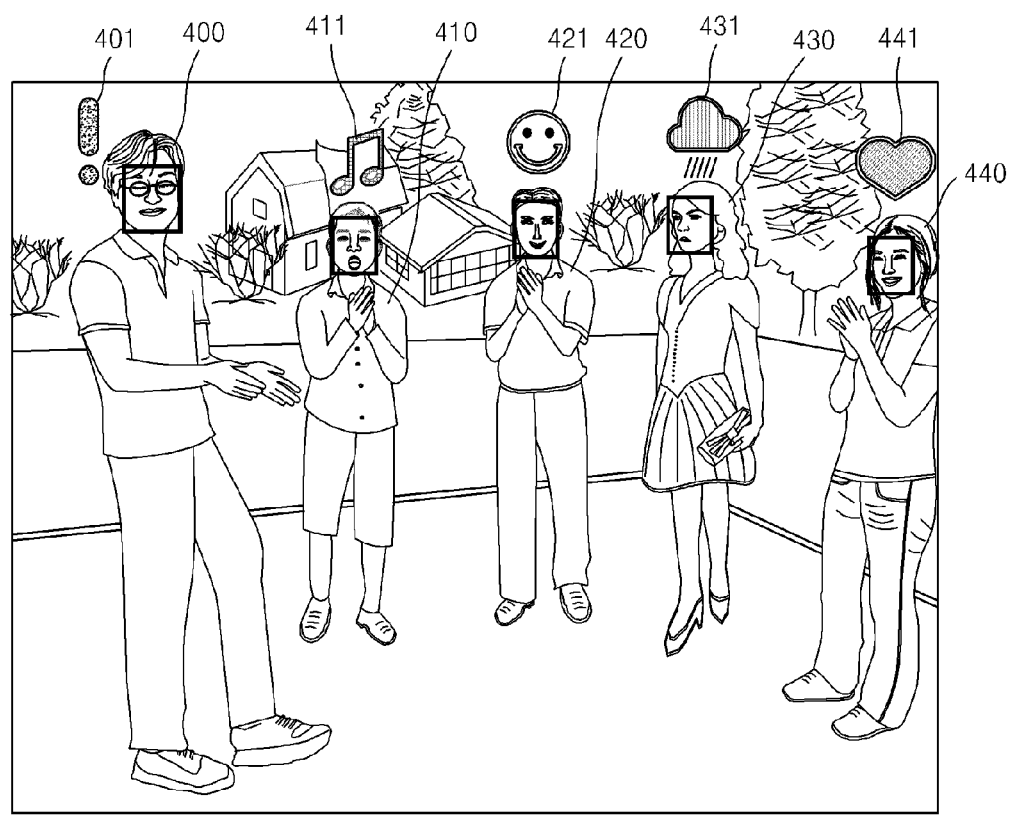
FIGS. 4 through 7 show examples for explaining icons corresponding to detected features of a subject, according to embodiments of the invention.

Referring to FIG. 4, a plurality of subjects 400 through 440 are displayed on an input image, and icons 401, 411, 421, 431, and 441 corresponding to respective features of the subjects 400, 410, 420, 430, and 440 are also displayed. In this case, the icon 401 indicates that the eyes of the subject 400 are closed. The icon 411 indicates that the subject 410 is smiling and moving quickly. The icon 421 indicates that the subject 420 is smiling. The icon 431 indicates that the subject 430 is not smiling. The icon 441 indicates that the subject 440 is smiling. In this case, the icons 401, 411, 421, 431, and 441 are displayed having colors that are the same as dress colors of the subjects 400, 410, 420, 430, and 440, respectively. However, an icon warning against an inappropriate situation for photographing may have a distinct color, for example, may be red. In addition, the icons 401, 411, 421, 431, and 441 may change according to changes in the features of the subjects 400, 410, 420, 430, and 440.

Figure 5:
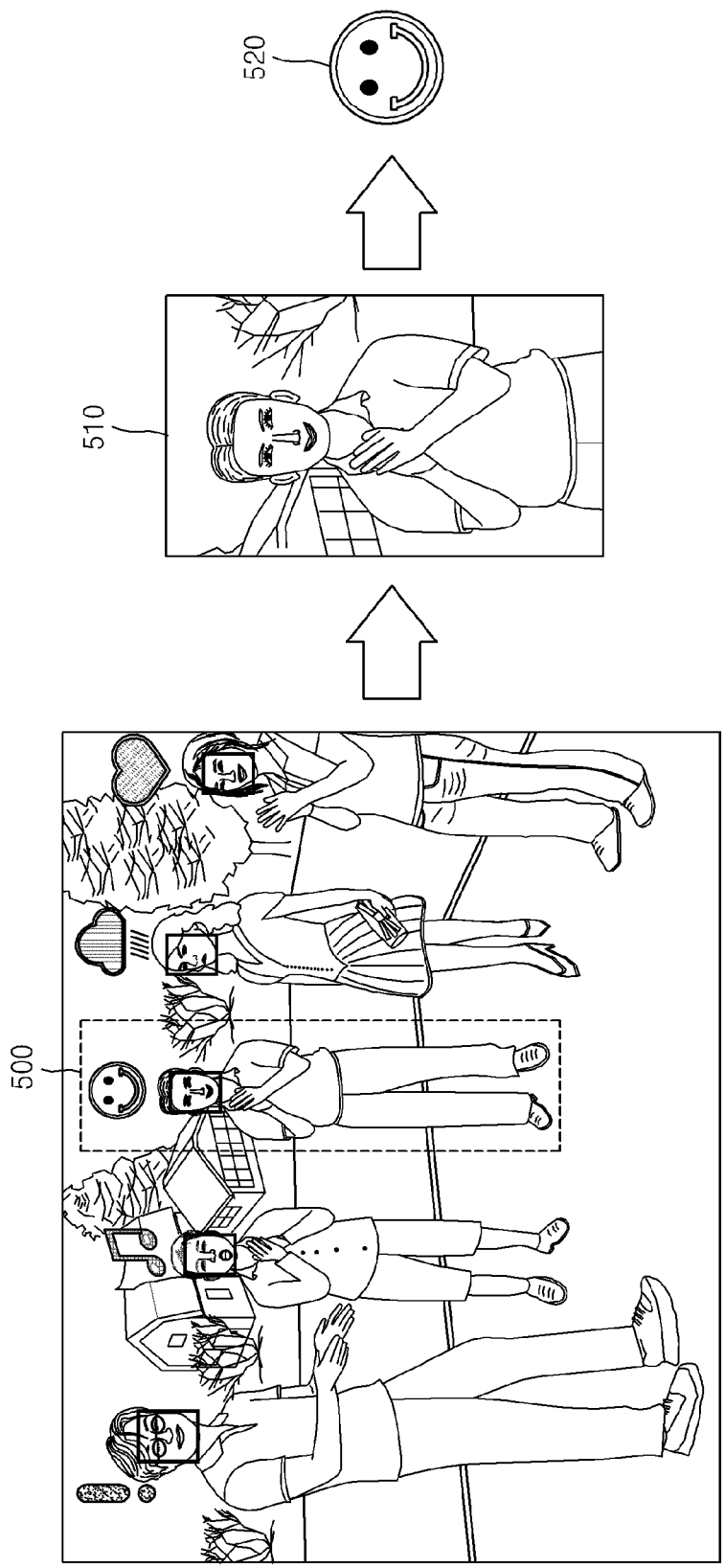

Referring to FIG. 5, a subject 500 is detected, and a feature 510 of the subject 500 is detected. In this case, a dress color of the subject 500 is determined, and it is determined that the subject 500 is smiling from the shape of the lips of the subject 500. Thus, a smiley icon 520 having the same color as the dress color of the subject 500 is displayed above the head of the subject 500 or around the subject 500.

Figure 6:
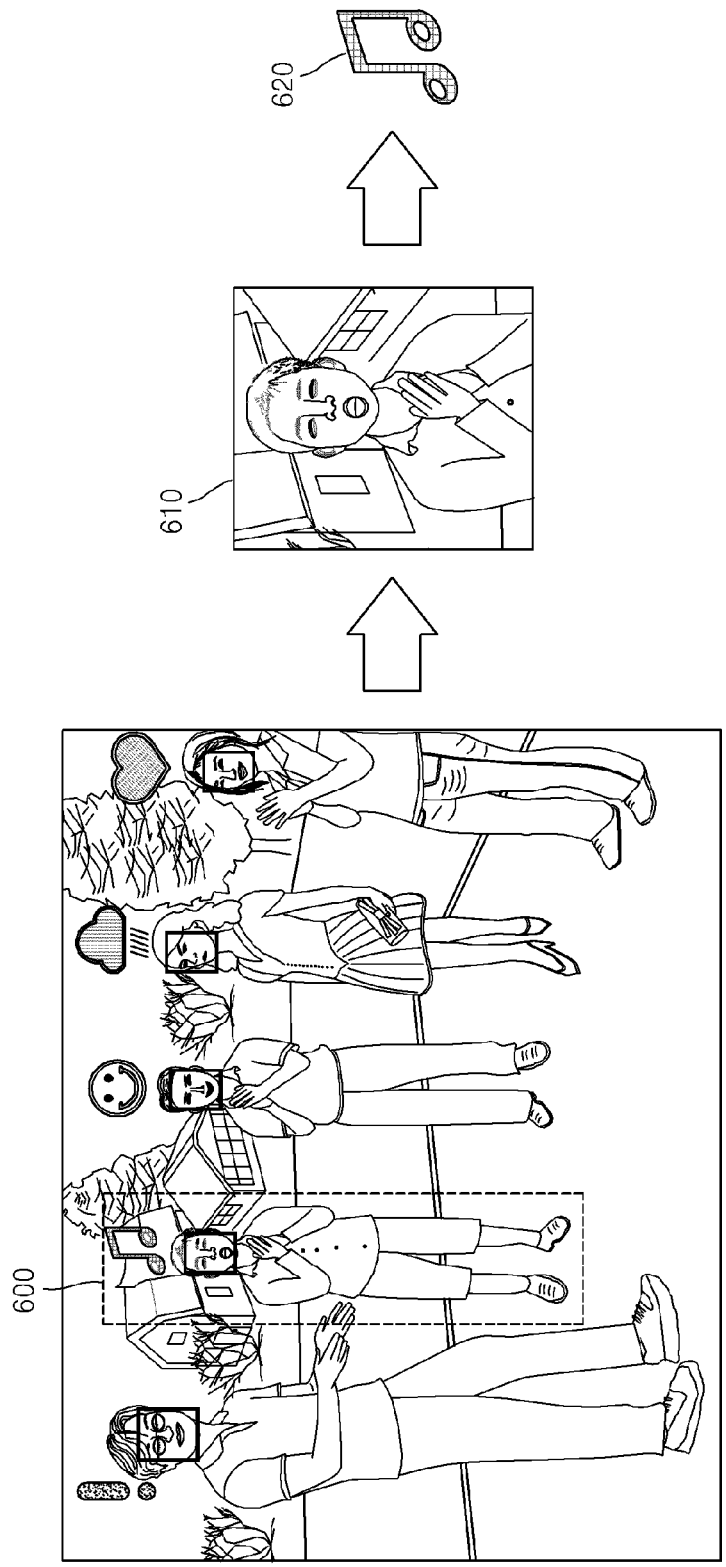

Referring to FIG. 6, a subject 600 is detected, and a feature 610 of the subject 600 is detected. In this case, a dress color of the subject 600 is determined, and it is determined that the subject 600 is smiling, and a movement of the subject 600 is active, from the shape of the lips the subject 600, and an applauding movement of the subject 600. Thus, a note icon 620 having the same color as the dress color of the subject 600 is displayed above the head of the subject 600 or around the subject 600. In this case, although two features of the subject 600 are detected, the note icon 620 is displayed according to a predetermined priority that is given to movement. Alternatively, two icons corresponding to the two features may be displayed together.

Figure 7:
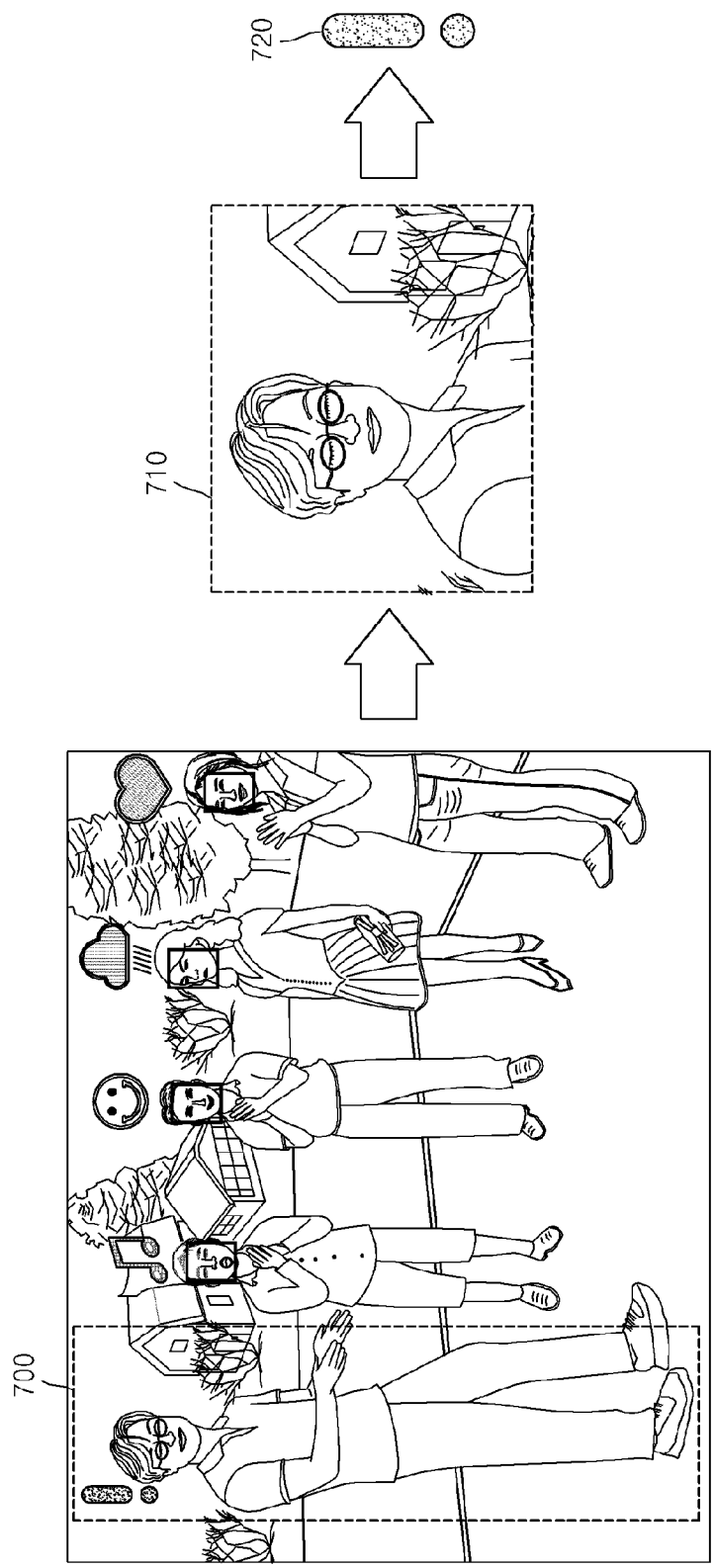

Referring to FIG. 7, a subject 700 is detected, and a feature of the subject 710 is detected. In this case, a dress color of the subject 700 is determined, an eye size of the subject 700 is determined, and whether the subject 700 is wearing glasses is determined. Thus, an exclamation mark icon 720 as a care mark about closed eyes is displayed above the head of the subject 700 or around the subject 700. In this case, the situation is inappropriate for photographing, and thus a red icon as a care mark, and not an icon having the same color as the dress color of the subject 700, is displayed. In this case, although two features of the subject 700 are detected, a priority is given to the inappropriate situation, and the exclamation mark icon 720 corresponding to closed eyes is displayed. In this case, a voice for guiding the subject 700 through photographing, such as "Please, open your eyes." corresponding to the exclamation mark icon 720 is output according to a user's selection, for example, by touching the exclamation mark icon 720 or the subject 700. Alternatively, when an inappropriate icon for photographing is displayed on an input image, the voice corresponding to the exclamation mark icon 720 may be automatically output.

Figure 8:
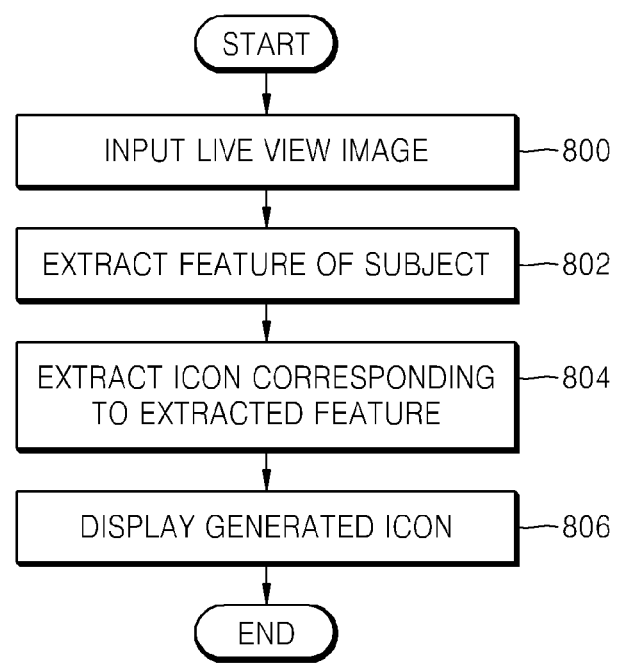
FIG. 8 is a flowchart describing a method of controlling a digital photographing apparatus, according to an embodiment of the invention.

FIG. 8 is a flowchart describing a method of controlling a digital photographing apparatus, according to an embodiment of the invention.

Referring to FIG. 8, in operation 800, a live view image is input. In operation 802, features of a subject are extracted. In this case, the features of the subject include an outer appearance, an eye size, a lip shape, and a movement of the subject, but are not limited thereto. In operation 804, icons corresponding to the respective extracted features of the subject are extracted. The icons may be selected and modified. In this case, the icons corresponding to the respective features are stored, and icons corresponding to the respective features of the subject are extracted. In operation 806, the extracted icons are displayed together with the subject on the live view image. In addition, a photographing operation is performed according to a user's selection, and a captured image and the icons may be synthesized, stored, and recorded.

Figure 9:
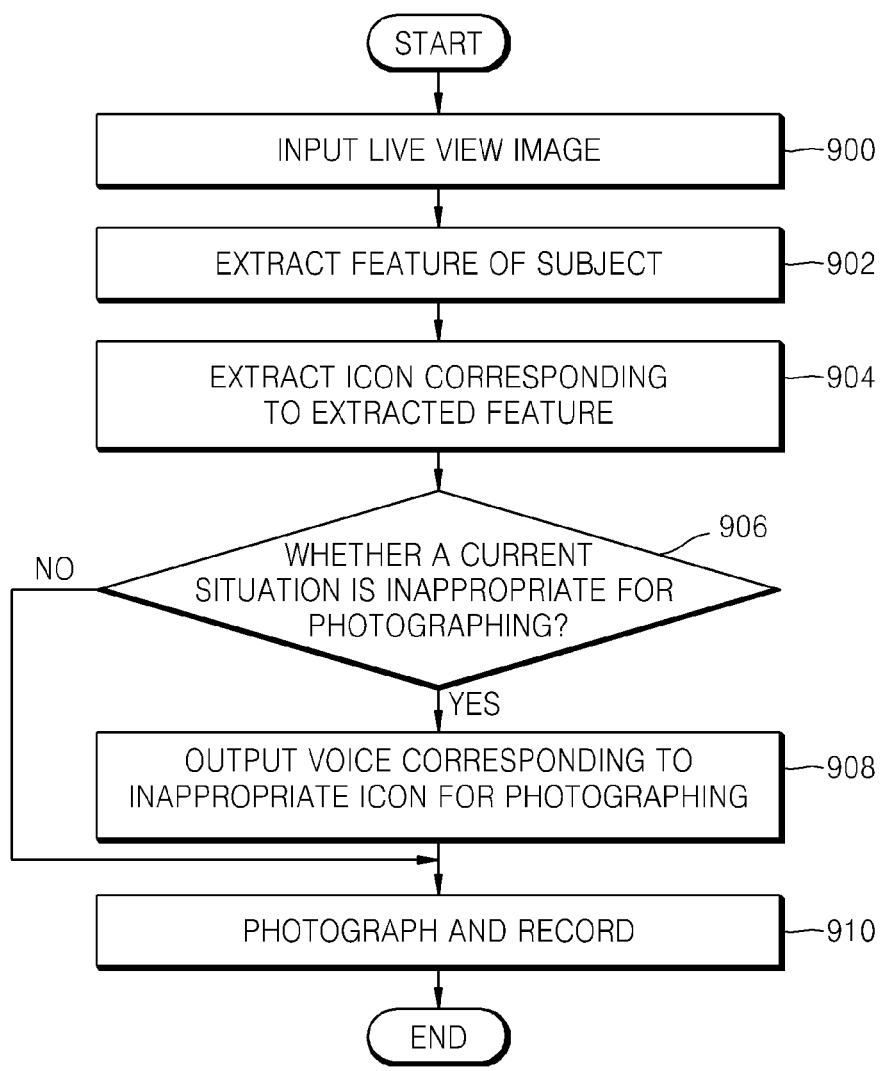
FIG. 9 is a flowchart describing a method of controlling a digital photographing apparatus, according to another embodiment of the invention.

FIG. 9 is a flowchart describing a method of controlling a digital photographing apparatus, according to another embodiment of the invention.

Referring to FIG. 9, operations 900 through 904 are the similar as operations 800 through 804 of FIG. 8. In operation 906, it is determined whether a current situation is inappropriate for photographing. That is, it is determined whether a displayed icon indicates that it is inappropriate to capture an image. In this case, the icon that indicates it is inappropriate for photographing may include, for example, an exclamation mark icon or a negative icon respectively corresponding to closed eyes and to lips that are not smiling. In operation 906, when the icon that indicates it is inappropriate for photographing exists in the displayed icons, a voice corresponding to the icon that indicates it is inappropriate for photographing is output in operation 908. For example, a voice may have a message such as "Please, open your eyes", "Please remain still", or "Please, smile" is output. In this case, the voice may be output automatically, or according to a user's selection. In operation 910, after the voice for guiding photographing is output in operation 908, a live view image is captured by fully pressing a shutter release button, and the captured image is recorded in a recording medium (not shown). In this case, a captured image and the icon may be synthesized, stored, and recorded, according to the user's selection. The icon may not be synthesized. In embodiments, operation 908 may return to operation 900 until there are no icons that indicate it is inappropriate for photographing.

So far, a case where features of a subject are extracted from a live view image and icons corresponding to the respective features are displayed has been described, but the invention is not limited thereto. That is, the features of the subject may be extracted from a moving picture during photographing, and icons corresponding to the respective features may be displayed.

According one or more embodiments of the invention, communication between a photographer and a subject may be possible by extracting features of the subject from a live view image and displaying icons corresponding to the respective features, and thus a smooth photographing operation may be performed.

In addition, when a plurality of people are photographed, a predetermined person in an inappropriate situation may be prevented from being photographed without checking individual faces.

According to the one or more embodiments of the invention, when children are photographed, an inattentive child's interest may be attracted to a camera and thus the child may be photographed while the child is focusing on images displayed on the camera.

In addition, people who are nervous during photographing may relax and be comfortable, and thus various face expressions may be photographed. Additionally, the photographer may not need to focus on the details of a face or small features on an LCD, but rather may rely on icons which may be easier to recognize.

A method and digital photographing apparatus by which communication between a photographer and a subject is possible by extracting features of the subject from a live view image and displaying icons corresponding to the respective features is disclosed, which may permit performance of a smooth photographing operation.

As the invention allows for various changes and numerous embodiments, particular embodiments are illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the invention. In the description of the invention, certain detailed explanations of related art are omitted when it is deemed that they may unnecessarily obscure the essence of the invention.

The terms such as "first" and "second" are used herein merely to describe a variety of constituent elements, but the constituent elements are not limited by the terms. The terms are used only for the purpose of distinguishing one constituent element from another constituent element.

The terms used in the current specification are used for explaining a specific exemplary embodiment, not limiting the inventive concept. Thus, the expression of singularity in the current specification includes the expression of plurality unless clearly specified otherwise in context. Also, the terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

The digital photographing apparatus described herein may include a processor, a memory for storing and executing program data, a permanent storage unit such as a disk drive, a communication port for handling communications with external devices, and a user interface device such as a touch panel, keys, and buttons. The methods may be implemented as software modules or algorithms, and may be stored as program instructions or computer-readable codes executable on the processor on a computer-readable recording medium. Here, examples of the computer-readable recording medium include a magnetic storage medium (e.g., a read-only memory (ROM), a random-access memory (RAM), a floppy disk, or a hard disk), and optical reading medium (e.g., a compact disk (CD)-ROM or a digital versatile disk (DVD)). The computer-readable recording medium may be distributed over network coupled computer systems so that the computer-readable code may be stored and executed in a distributed fashion. The computer-readable recording medium may be read by the computer, stored in the memory, and executed by the processor.

All references including publications, patent applications, and patents cited herein are hereby incorporated by reference to the same extent as if each reference were individually and specifically indicated to be incorporated by reference and were set forth in its entirety herein. For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional blocks and various processing steps. Such functional blocks may be realized by any number of hardware or/and software components configured to perform specific functions. For example, the invention may employ various integrated circuit components, e.g., memory elements, processing elements, logic elements, and look-up tables, and the like, which may carry out a variety of functions under the control of one or more microprocessors or other control devices. Similarly, where the elements of the invention are implemented using software programming or software elements, the invention may be implemented with any programming or scripting language, such as C, C++, Java, or assembler, with various algorithms being implemented with any combination of data structures, objects, processes, routines, or other programming elements. Functional aspects may be implemented in algorithms that execute on one or more processors. Furthermore, the invention could employ any number of conventional techniques for electronics configuration, signal processing and/or control, data processing, and the like. The terms "mechanism", "element", "means", and "configuration" are broadly used, and are not limited to mechanical and physical embodiments, but can include software routines in connection with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections, may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A digital photographing apparatus comprising:
   a digital signal processing unit configured to detect a feature of a subject from an input image and to display an icon corresponding to the feature;
   wherein the feature comprises at least one of an outer appearance of the subject, an eye size of the subject, a lip shape of the subject, a movement of the subject, and a dress color of the subject; and
   wherein when at least two features of the subject from the input image are detected, the digital signal processing unit is configured to select one icon to indicate whether it is appropriate to capture an image of the subject among at least two icons corresponding to the detected at least two features, and to display the selected one icon together with the subject.

2. The digital photographing apparatus of claim 1, wherein the digital photographing apparatus is configured to display the icon to indicate whether or not it is appropriate to capture an image of the subject based on the feature of the subject.

3. The digital photographing apparatus of claim 1, wherein the input image is a live view image.

4. The digital photographing apparatus of claim 1, wherein the digital signal processing unit displays the icon having the same color as the dress color.

5. The digital photographing apparatus of claim 1, wherein the digital signal processing unit changes and displays the icon according to a change in the feature of the subject.

6. The digital photographing apparatus of claim 1, wherein the digital signal processing unit is configured to output a message associated with the icon, wherein the message is according to a user's configuration.

7. The digital photographing apparatus of claim 1, wherein the digital signal processing unit comprises:
   a subject feature detecting unit configured to detect the feature of the subject of the input image;
   an icon storage unit configured to store the icon corresponding to the feature of the subject; and
   a display controlling unit configured to extract the icon corresponding to the feature of the subject from the icon storage unit, and display the extracted icon together with the subject.

8. The digital photographing apparatus of claim 1, wherein the digital signal processing unit is configured to synthesize a captured image using the input image and the displayed icon.

9. The digital photographing apparatus of claim 7, wherein the subject feature detecting unit comprises:
   a face detecting unit configured to detect a face region of the subject;
   a face determining unit configured to determine at least one of an eye size and a lip shape of the detected face region;
   an appearance determining unit configured to determine at least one of a dress color of the subject, and whether the subject is wearing glasses; and
   a movement determining unit configured to determine whether a movement of the subject is at least one of an active movement and a passive movement.

10. A digital photographing apparatus comprising:
    a subject feature detecting unit configured to detect a feature of a subject from a live view image;
    an icon storage unit configured to store an icon corresponding to the feature of the subject; and
    a display controlling unit configured to extract the icon corresponding to the feature of the subject from the icon storage unit, and to display the extracted icon together with the subject,
    wherein the feature of the subject is at least one of an outer appearance of the subject, an eye size of the subject, a lip shape of the subject, a movement of the subject, and a dress color of the subject, and
    wherein when at least two features of the subject from the live view image are detected, the digital photographing apparatus is configured to select one icon to indicate whether it is appropriate to capture an image of the subject among at least two icons corresponding to the detected at least two features, and to display the selected one icon together with the subject.

11. The digital photographing apparatus of claim 10, wherein the display controlling unit is configured to display the icon having the same color as the dress color.

12. The digital photographing apparatus of claim 10, further comprising a voice output controlling unit configured to control an output of a message corresponding to the icon.

13. A method of controlling a digital photographing apparatus, the method comprising:
    detecting a feature of a subject from an input image; and
    displaying an icon corresponding to the feature, wherein the icon indicates whether taking a photograph of the subject is appropriate,
    wherein the feature of the subject is at least one of an outer appearance of the subject, an eye size of the subject, a lip shape of the subject, a movement of the subject, and a dress color of the subject, and
    wherein when at least two features of the subject from the input image are detected, selecting one icon to indicate whether it is appropriate to capture an image of the subject among at least two icons corresponding to the detected at least two features, and displaying the selected one icon together with the subject.

14. The method of claim 13, wherein the feature is an outer appearance of the subject or an indication of whether or not the subject is moving.

15. The method of claim 13, wherein the displaying comprises displaying an icon having the same color as the dress color.

16. The method of claim 13, further comprising controlling an output of a voice corresponding to the icon.

17. The method of claim 13, wherein the displaying comprises changing and displaying the icon according to a change in the feature of the subject.

18. The method of claim 13, wherein the detecting comprises:
    detecting a face region of the subject;
    determining at least one of an eye size and a lip shape of the detected face region;
    determining at least one of a dress color of the subject, and whether the subject is wearing glasses; and determining whether a movement of the subject is at least one of an active movement and a passive movement.

19. The method of claim 18, wherein the displaying comprises:
selecting at least one icon to be displayed according to a predetermined priority, if the feature of the subject corresponds to a plurality of icons; and
displaying the selected icon together with the subject.

* * * * *